UNITED STATES PATENT OFFICE.

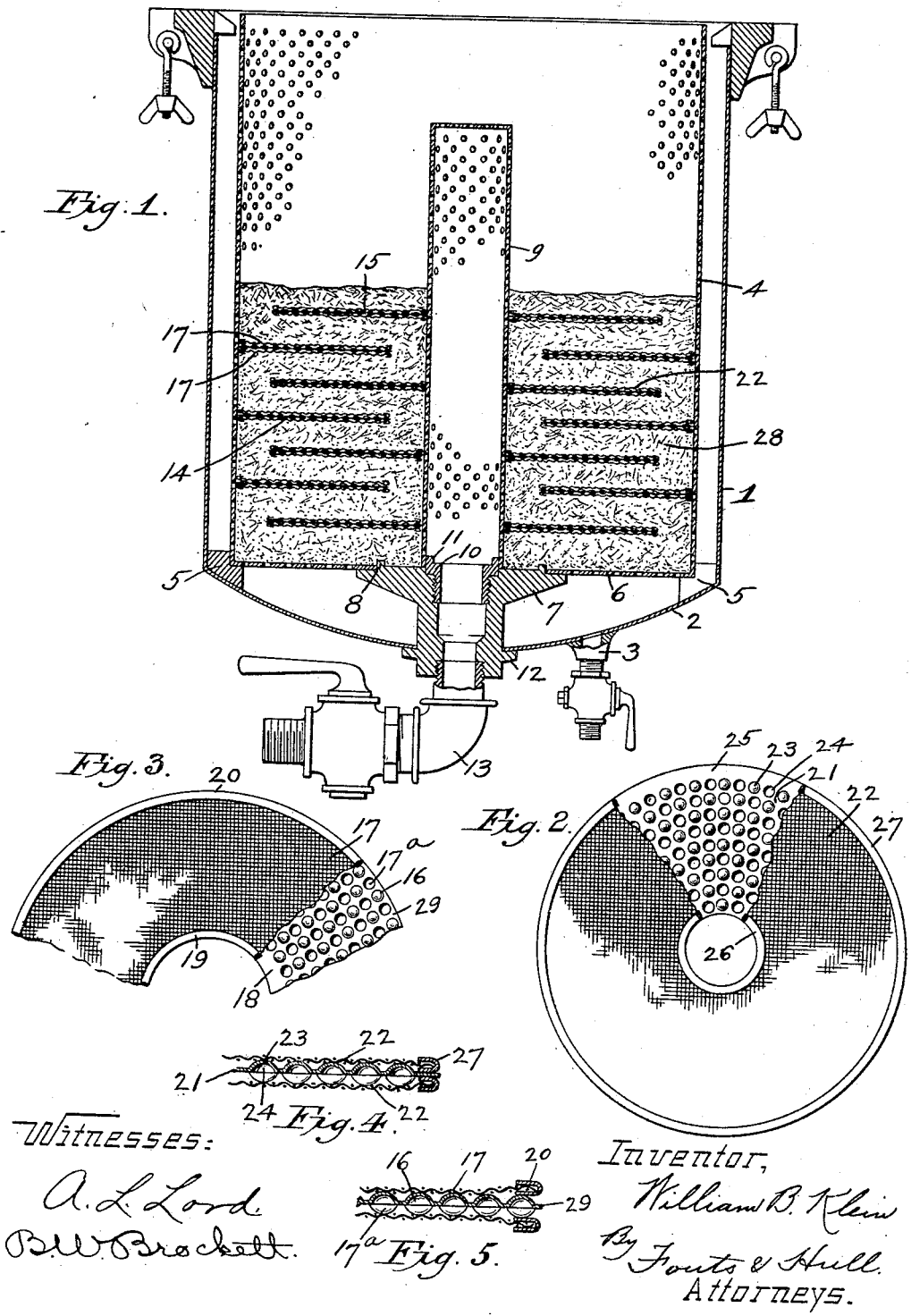

WILLIAM B. KLEIN, OF CHICAGO, ILLINOIS.

FILTER.

No. 824,487.  Specification of Letters Patent.  Patented June 26, 1906.

Application filed August 2, 1905. Serial No. 272,331.

*To all whom it may concern:*

Be it known that I, WILLIAM B. KLEIN, residing at Chicago, in the county of Cook and State of Illinois, have invented a certain new and useful Improvement in Filters, of which the following is a full, clear, and exact description, reference being had to the accompanying drawings.

My invention relates to filters, and particularly to those of the type shown in the patent to Charles H. Loew, No. 634,947, issued October 17, 1899. In the construction of filters of this type the main desiderata are cheapness of production and rapidity and thoroughness of filtration. To accomplish these results to a greater extent than has been done heretofore in constructions with which I am familiar, I have devised a novel form of distributing and concentrating elements.

The invention may be defined as consisting of a filter having therein series of distributing and concentrating elements of novel construction and also in a novel construction of such elements for use in a filter; also, a novel construction of filter-plate or conductor.

Generally speaking, my invention may be defined as consisting of the combinations of elements embodied in the claims hereto annexed.

In the drawings, Figure 1 represents a vertical section through a filter having applied thereto a number of distributing and concentrating elements constructed in accordance with my invention. Fig. 2 represents a plan view of one of the inner or collecting elements, the screen thereabove being broken away to show the plate beneath. Fig. 3 represents a plan view of a portion of one of the outer or distributing elements, the screen thereabove being broken away to show the plate beneath. Fig. 4 represents an enlarged sectional detail through the outer portion of a collecting-plate, showing the manner in which the screens are applied thereto; and Fig. 5 represents a corresponding view through the outer portion of one of the distributing-plates and its screens.

Describing the parts by reference-numerals, 1 represents the outer cylindrical casing of a filter of the "Loew" type hereinbefore referred to, said casing having a rounded bottom 2, provided with a valve-controlled drain-outlet 3. Supported within and annularly spaced from the casing 1 is the cylindrical crib or kettle 4, said crib or kettle being made of perforated material, a sufficient number of perforations being shown to indicate the uniformly-perforated character of the said material. The said kettle or crib may be supported by lugs or shoulders 5. The inner end of the perforated bottom 6 is supported by the outer portion of the central outlet-casting 7, a flange 8 being provided, against which the inner end of the bottom abuts.

A central perforated discharge-tube 9 is supported by the outlet-casting 7, preferably by means of a threaded thimble 10 screwing into the outside casting and having an upwardly-extending flange 11, over which the lower end of the tube 9 is sleeved. The lower end of the casting 7 is provided with a flange 12, which engages the lower surface of the rounded bottom 2, said bottom forming a tight joint with said casting. Threaded into the lower end of the casting 7 is the sleeved outlet connection 13.

Within the crib or kettle 4 are two series of annular filtering elements 14 and 15. Each of the filtering elements 14 comprises an annular conductor-plate 29, having projections 16 extending from opposite faces thereof, and an annular screen 17, of wire-gauze or equivalent material, placed above and below said plate. The projections 16 are preferably formed by pressing the metal of the plate outwardly by means of suitable dies, the dies being constructed so as to stagger the projections on one face of the plate with respect to those on the opposite face, with the result that each face of the plate is provided with recesses 17ª intermediate of the projections thereon. The inner or end edge 18 of the distributing-plate is plain or free from projections and recesses, as shown more particularly in Fig. 3. The inner and outer edges of the screen 17 are provided with clamping-rings 19 and 20, respectively, the former ring resting on the plain portion 18 of the plate, the latter ring resting on the corrugated outer portion of said plate. A similar screen is applied to the under side of the plate, as indicated in Figs. 1 and 4 of the drawings, the latter figure showing on an inner plate the same arrangement of screens as are employed with the outer plates.

Each of the filtering elements 15 comprises an annular plate 21 with a screen 22 above and below the same. The central opening in said plate is of a size permitting the plate to be slipped over the central tube 9. The upper and lower surfaces of each of the plates 21 is corrugated or provided with projections 23 and recesses 24, formed and arranged in the same manner as on the upper and lower surfaces of the plates 29. The outer edge 25 of each of the plates 21 is plain or unprovided with projections and recesses. Each of the screens 22 is provided at its inner and outer edges with clamping-rings 26 27, respectively, the former ring bearing against the inner corrugated edge portion 21 and the latter ring bearing against the outer plain portion of said ring. A similar screen is provided below said plate 21. The particular manner in which these projections and recesses are formed in plates 29 and 21 is indicated in Figs. 4 and 5, wherein the outer portions of one each of the filter-plates 21 and 29 are shown. The formation of the projections 23 on one face will result in corresponding recesses 24 in the opposite face, and vice versa.

To obtain greatest efficiency, the filter should be assembled so that the distance between the elements 14 and 15 is equal to the distance between the outer edge of an element 15 and the crib or kettle 4 and to the distance between the inner edge 18 or periphery of the filtering element 14 and the perforated tube 9.

It will be observed that the plain portion of the plate 29 is provided at the edge remote from the receiving portion of the plate, which receiving portion abuts against the wall of the crib or kettle 4. The liquid to be filtered is supplied to this crib or kettle under pressure, as is the mode of operation in filters of the Loew type. The liquid flows readily along both surfaces of the conductor-plates 29, through the screens 17 and the filter-pulp, and through the screens 22 and along the conductor-plates 21 to the tube 9. The provision of the plain surfaces at the outer edges of the plates 21 causes the clamping-rings 27 of their screens to fit tightly thereagainst and to prevent the liquid distributed by the plates 29 from reaching said plates 21 except from the filtering elements 14 and through the screens 22.

By the particular construction of conductor-plates herein described I am enabled to increase both the cheapness and efficiency of the filter. Instead of employing two separated plates with a conducting-space therebetween I employ but one plate constructed to freely distribute the filtrate on each side thereof. The cost of construction of each of said plates is inconsiderable, as the plates are given the effective shape herein shown by merely subjecting them to pressure between dies. The thickness of a single element consisting of a plate and two screens is about half the thickness of an element consisting of a pair of spaced plates with gauze on each side of the same. This permits a greater number of elements to be inserted in a filter of a given depth, maintaining the same distance between said elements as in prior constructions, thereby increasing the capacity of the filter. The projections on the plates are discontinuous as distinguished from ordinary corrugations or ribs, thereby distributing the liquid throughout the extent of the plate and in the case of an outer plate preventing the accumulation of the liquid at the inner edge thereof and insuring its distribution to the filter mass. At the same time the avoidance of perforations in the plate renders it capable of easy and thorough cleaning. In the drawings I have shown in enlarged detail the outer portions only of a collecting and a distributing element, as it will be readily understood that they correspond, respectively, with the inner portions of a distributing and a collecting element.

While I have shown the filter-plates as annular, it will be evident that the advantageous results which follow from the construction of my plates will be secured even though their shape should be somewhat modified, and while I have described my invention in detail it is obvious that such details may be modified more or less without departing from the spirit of my invention, and I do not propose to be limited to such details except as they may be positively included in the claims hereto annexed.

Having thus described my invention, what I claim as new, and desire to secure by Letters Patent, is—

1. An imperforate filter-plate having a surface thereof provided with discontinuous rounded projections, there being discontinuous rounded recesses in the body of said plate intermediate of said projections, substantially as specified.

2. An imperforate filter-plate having its opposite sides provided with discontinuous rounded projections, there being discontinuous rounded recesses in the body of said plate intermediate of said recesses, substantially as specified.

3. An imperforate sheet-metal filter-plate having the body bent outwardly on each side thereof to form discontinuous rounded projections on one side and corresponding rounded recesses on the other side, the projections and recesses on one side being staggered with respect to those on the other side, substantially as specified.

4. A conducting element for filters comprising in combination a plate having its opposite faces provided with projections extending to one edge of said plate and terminating short of the opposite edge thereof, leaving the plate plain adjacent the latter edge, a screen on each side of said plate having each of its opposite edges provided with a clamping-ring, the ring at one edge bearing against the projections at one edge of said plate and the ring at the opposite edge bearing against the plain portion of said plate, substantially as specified.

5. A conducting element for filters comprising in combination an imperforate plate having its opposite faces provided with discontinuous projections and recesses intermediate said projections, said projections and recesses extending to one edge of said plate and terminating short of the opposite edge thereof, leaving the plate plain adjacent the latter edge, a screen on each side of said plate, having each of its opposite edges provided with a clamping-ring, the ring at one edge bearing against the projections at one edge of said plate and the ring at the opposite edge bearing against the plain portion of said plate, substantially as specified.

6. In a filter, the combination of an outer casing, a crib or kettle within said casing having perforated side walls, a discharge-outlet from said casing, a central perforated tube within said crib or casing communicating with said outlet, a series of corrugated annular plates projecting within said casing from said crib or kettle and each having a plain or uncorrugated inner edge portion, annular screens above and below said plates, said screens having clamping-rings around the edges thereof, the inner rings corresponding to and adapted to engage the plain or uncorrugated edge portions of the plates, filtering material in said crib or kettle intermediate the outer wall and the central perforated tube and intermediate said screens, and means for conducting the filtered liquid to the central perforated tube, substantially as specified.

7. In a filter, the combination of an outer casing, a crib or kettle within said casing having perforated side walls, a discharge-outlet from said casing, a central perforated tube within said crib or casing and communicating with said outlet, a series of corrugated annular plates within said crib or casing and surrounding said tube, each of said plates having a plain or uncorrugated outer edge portion, annular screens above and below said plates, said screens having clamping-rings around the edges thereof, the outer rings corresponding to and adapted to engage the plain or uncorrugated edge portions of the plates, suitable filtering material in said crib or kettle intermediate the outer wall and central perforated tube and intermediate said screens, and means for distributing the liquid from the crib or kettle to the filtering material, substantially as specified.

8. In a filter, the combination of an outer casing, a crib or kettle within said casing having perforated side walls, a discharge-outlet from said casing, a central perforated tube within said crib or casing and communicating with said outlet, a series of corrugated annular plates within said crib or casing and communicating with said outlet, each of said plates having a plain or uncorrugated outer edge portion, a series of corrugated annular plates projecting within said casing from said crib or kettle and each having a plain or uncorrugated inner edge portion, annular screens above and below said plates, said screens having clamping-rings around the edges thereof corresponding to the plain or uncorrugated edge portions of the plates, and suitable filtering material in said crib or kettle intermediate the outer wall and central perforated tube and intermediate said screens, substantially as specified.

In testimony whereof I affix my signature in the presence of two witnesses.

WILLIAM B. KLEIN.

Witnesses:
F. W. HARRISON,
CARL N. LANGENBACH.